United States Patent
Kumar et al.

(10) Patent No.: US 9,678,793 B2
(45) Date of Patent: Jun. 13, 2017

(54) RESOURCE-BASED JOB SCHEDULING

(71) Applicant: International Business Machines Corporation, Armonk, NY (US)

(72) Inventors: Aruun K. Kumar, Richmond, VA (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/632,494

(22) Filed: Feb. 26, 2015

(65) Prior Publication Data
US 2016/0253208 A1  Sep. 1, 2016

(51) Int. Cl.
  *G06F 9/44*   (2006.01)
  *G06F 9/46*   (2006.01)
  *G06F 11/00*  (2006.01)
  *G06F 9/48*   (2006.01)
  *G06F 11/14*  (2006.01)

(52) U.S. Cl.
  CPC ........ *G06F 9/4881* (2013.01); *G06F 11/1402* (2013.01); *G06F 2209/485* (2013.01)

(58) Field of Classification Search
  None
  See application file for complete search history.

(56) References Cited

U.S. PATENT DOCUMENTS

| | | | |
|---|---|---|---|
| 5,274,813 A * | 12/1993 | Itoh | G06F 9/463 714/E11.117 |
| 6,701,345 B1 * | 3/2004 | Carley | G06F 17/30368 707/999.008 |
| 6,718,486 B1 * | 4/2004 | Roselli | G06F 11/1438 714/41 |
| 7,243,266 B2 | 7/2007 | Hiramatsu et al. | |
| 7,509,539 B1 | 3/2009 | Denefleh et al. | |
| 8,321,558 B1 * | 11/2012 | Sirota | G06F 9/5011 709/201 |
| 8,661,067 B2 | 2/2014 | Lehr et al. | |
| 8,914,798 B2 | 12/2014 | Augusto et al. | |
| 2001/0052108 A1 * | 12/2001 | Bowman-Amuah | G06Q 10/06 717/100 |
| 2004/0194107 A1 * | 9/2004 | Masuoka | G06F 9/542 718/100 |
| 2005/0060401 A1 * | 3/2005 | Brown | H04L 63/083 709/224 |
| 2007/0294697 A1 * | 12/2007 | Theimer | G06F 9/5027 718/102 |
| 2008/0127199 A1 * | 5/2008 | Miki | G06F 3/0613 718/105 |
| 2010/0318859 A1 * | 12/2010 | Augusto | G06F 11/0715 714/57 |
| 2013/0047164 A1 * | 2/2013 | Ujibashi | G06F 9/4881 718/104 |

(Continued)

FOREIGN PATENT DOCUMENTS

KR   1020140077766 A   6/2014

*Primary Examiner* — Insun Kang

(74) *Attorney, Agent, or Firm* — Lance I. Hochhauser

(57) ABSTRACT

Resource-based optimization is used to resolve some abnormal job terminations. An abnormal job termination is analyzed to determine if a resource shortage caused the termination. For a resource-dependent termination, the job is rescheduled for a time when sufficient resources are available.

20 Claims, 2 Drawing Sheets

(56) References Cited

U.S. PATENT DOCUMENTS

2013/0152047 A1* 6/2013 Moorthi ............... G06F 11/368
717/124
2013/0339956 A1* 12/2013 Murase .................. G06F 9/505
718/1
2013/0346994 A1* 12/2013 Chen ..................... G06F 9/5044
718/104

* cited by examiner

RESOURCE-BASED JOB SCHEDULING

BACKGROUND

The present invention relates generally to the field of software management, and more particularly to job optimization.

Batch jobs are often executed in a particular sequence and within a predefined batch execution window. In many instances, the batch jobs need to be completed by a certain time to feed relevant information to other processes and/or programs. A delay in the completion of a batch job may delay the completion of a batch application in violation of an existing service level agreement (SLA). One type of event that commonly delays the completion of batch jobs is an ABEND. An ABEND is an abnormal ending or termination of a job, or software program. When a job results in an ABEND, the impact can be severe. A user must expend time and resources to analyze the ABEND and take corrective actions.

SUMMARY

According to an aspect of the present invention, there is a method, computer program product, and/or system that performs the following steps (not necessarily in the following order): (i) determining a type of an abnormal termination of a job; (ii) collecting resource usage data; (iii) analyzing resource availability, based at least in part on the resource usage data, to generate a resource availability analysis; and (iv) responsive to a determination that the type is environmental, taking a rescheduling action, based at least in part on the resource availability analysis. At least the determining step is performed by computer software running on computer hardware.

DETAILED DESCRIPTION

Figure 1:
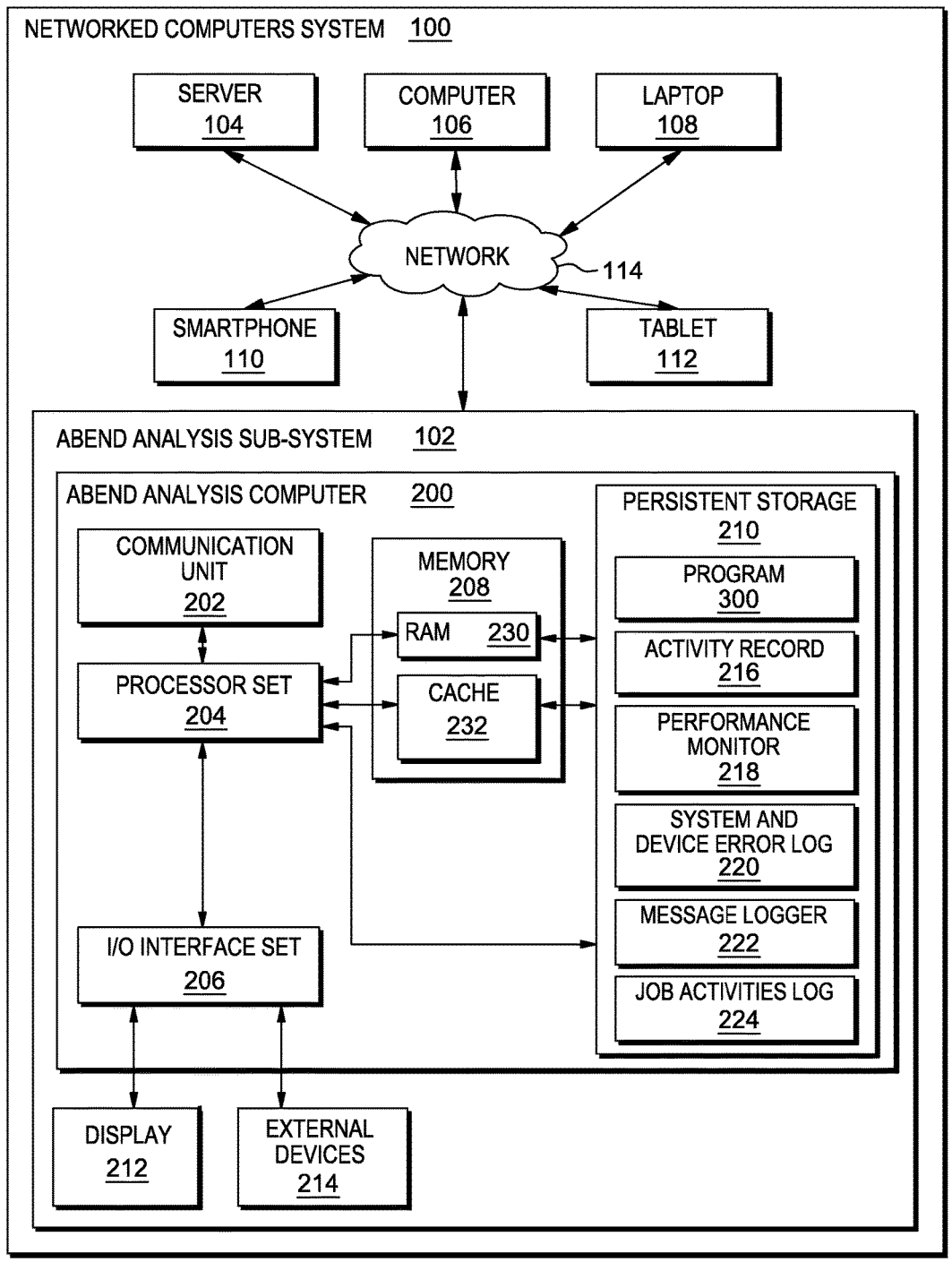
FIG. 1 is a block diagram view of a first embodiment of a system according to the present invention.

Resource-based optimization is used to resolve some abnormal job terminations. An abnormal job termination is analyzed to determine if a resource shortage caused the termination. For a resource-dependent termination, the job is rescheduled for a time when sufficient resources are available. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: abnormal termination (ABEND) analysis sub-system 102; server sub-system 104; computer sub-system 106; laptop sub-system 108; smartphone sub-system 110; and tablet sub-system 112; communication network 114; abnormal termination (ABEND) analysis computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
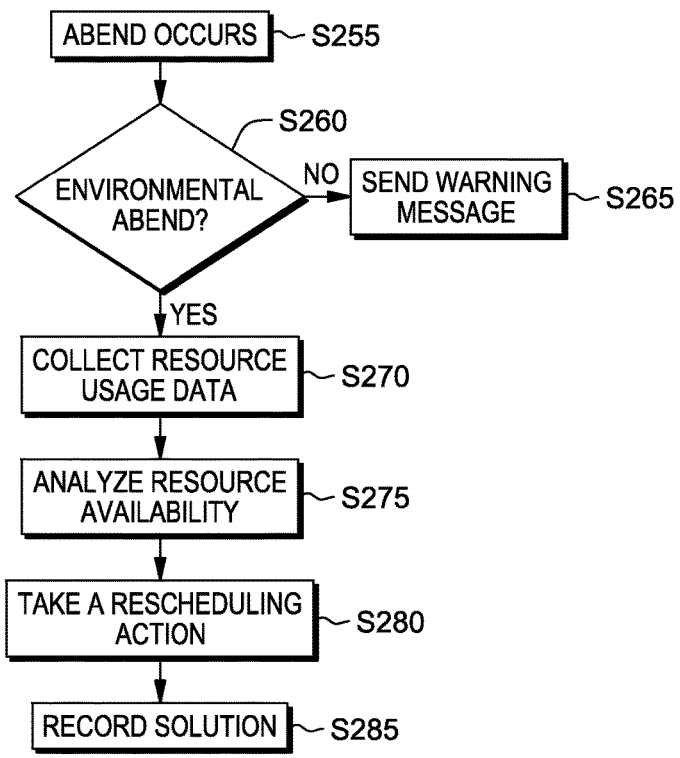
FIG. 2 is a flowchart showing a first embodiment method performed, at least in part, by the first embodiment system.
Figure 3:
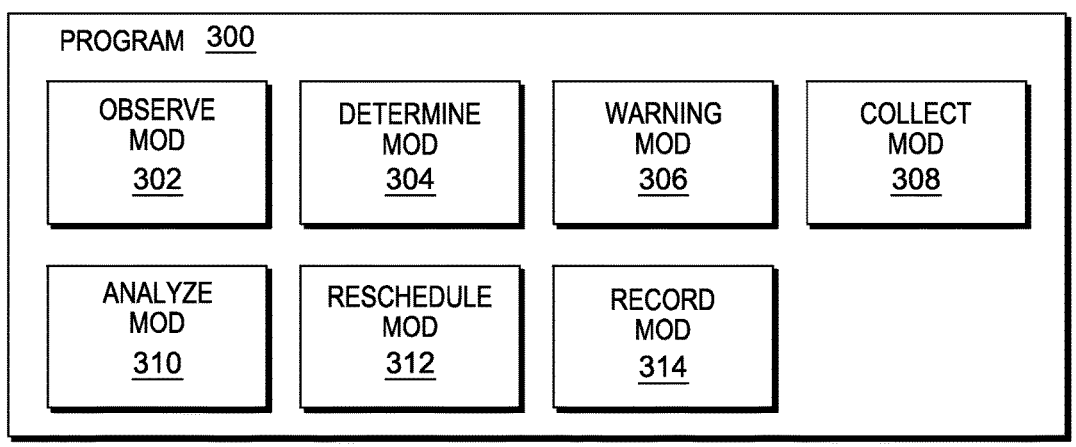
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where observe module ("mod") 302 observes a job, or program, that encounters an abnormal termination (ABEND). In this example, ABEND analysis sub-system 102 (FIG. 1) is a server on which a batch job creating a backup file encounters an ABEND. The ABEND code specifies that the job ran out of space because sufficient storage volumes were not available. Some common ABENDs include: (i) out of time; (ii) out of memory; (iii) out of space; (iv) storage not available; (v) protection exception; (vi) operation exception; (vii) fixed-point divide exception; (viii) resource unavailable; (ix) resource contention; and (x) operator canceled job. Alternatively, observe mod 302 operates over a network, such as network 114 (FIG. 1), to resolve ABENDs occurring on connected devices, such as laptop 108 (FIG. 1).

Processing proceeds to decision step S260, where determine mod 304 determines whether the type of ABEND encountered by the job is environmental. If the ABEND is non-environmental, processing proceeds through the "No" branch. If the ABEND is environmental, processing proceeds through the "Yes" branch. Environmental ABENDs are caused by factors within the operating environment, such as a lack of resources. Some environmental ABENDs arise due to a resource shortage in a direct-access storage device (DASD), a CPU, or a memory, or due to critical data sets already being in use. Non-environmental ABENDs arise for reasons other than a lack of resources. These non-environmental ABENDs may also result from user inputs. In this example, the ABEND encountered by the backup batch job, an "out of space" ABEND, is environmental. Therefore, processing proceeds through the "Yes" branch.

Environmental ABENDs include, but are not limited to, out of space ABENDs, out of time ABENDs, and out of memory ABENDs. A multitude of factors may give rise to one of these three types of environmental ABENDs. For example, if an executed job takes up more RAM than was allocated or if there is insufficient RAM to process the job, an out of memory ABEND will occur. If two jobs contend for the same resources, an out of time ABEND will occur. If there is insufficient storage on the hard drive, an out of space ABEND will occur. Some of these resource usage factors have predictable ebbs and flows.

Additionally, secondary ABENDs behave as environmental ABENDs; the factor within the operating environment appearing as a lack of resources is the output from an earlier job that encountered an ABEND. For example, a second batch job is dependent on a result from a first batch job. If the first batch job results in an ABEND, the second batch job is unable to run properly and will also result in an ABEND. The ABEND type for the second batch job is irrelevant because the underlying cause is the "lack of resources" resulting from the ABEND of the first batch job.

Following the "No" branch from step S260, processing ends at step S265, where warning mod 306 transmits a warning to the user with a suggested solution to the ABEND. In this example, processing does not proceed to step S265. Alternatively, the ABEND is non-environmental such as an attempt to divide by zero. In this alternative, a warning message is transmitted suggesting the divisor of the equation be compared to zero prior to dividing. Alternatively, the warning includes a set of known resolutions to the non-environmental ABEND and provides a set of recommended actions based on the set of known resolutions.

Following the "Yes" branch from step S260, processing proceeds to step S270, where collect mod 308 collects resource usage data. Resource usage data may include, but is not limited to: (i) the operating system; (ii) input/output (I/O) information; (iii) network activity; (iv) software usage; (v) error conditions; (vi) processor utilization; (vii) storage capacity; (viii) storage partitions; (ix) memory capacity; (x) jobs running concurrently with the job that terminated; (xi)

resources used by the job that terminated; and/or (xii) a record of solutions to prior ABENDs, as recorded in step S285, below. Alternatively, the resource usage data collected is tailored to the type of environmental ABEND. In this example, the ABEND code relates to an out of space ABEND; therefore, memory capacity (e.g., RAM usage) is not relevant to creating a solution. Alternatively, if the ABEND code related to an out of memory ABEND, storage capacity would not be relevant, but memory capacity would be a vital piece of resource usage data. In this example, the resource usage data on ABEND analysis sub-system 102 is found across multiple locations, including: activity record 216; performance monitor 218; system and device errors log 220; and/or message logger 222 (FIG. 1). Alternatively, the resource usage data is aggregated in one location within ABEND analysis sub-system 102.

Processing proceeds to step S275, where analyze mod 310 analyzes performance monitor 218 (FIG. 1) for available resources. Analyze mod 310 determines whether the conditions leading to the ABEND exist at other times and whether the ABEND can be avoided by rescheduling the job at a different time. Analysis of performance monitor 218 is based at least in part on the resource usage data collected in step S270. As the limiting resource causing the ABEND in this example was a lack of storage volumes, the analysis of performance monitor 218 focuses on time periods when the required storage volumes will be available.

Processing proceeds to step S280, where reschedule mod 312 takes a rescheduling action based on the analysis in step S275. A rescheduling action includes one or more of: (i) automatically rescheduling the job to the optimal time; (ii) automatically rescheduling the job to a less optimal time that meets scheduling requirements; and/or (iii) sending a warning message. The warning message includes one or more of: (i) a suggested rescheduling time; and/or (ii) resources that must be freed for rescheduling to be an available option. In this example, the job that abnormally terminated in step S255 is scheduled for the period immediately after a system cleanup, which maximizes the available storage volumes required by the job. Alternatively, special criteria require the next runtime for the job to be scheduled at a sub-optimal time. For example, a payroll batch job must be run before midnight, but the optimal runtime is at 2:00 am; the payroll batch job is scheduled to run at 11:30 pm because of the special condition.

Processing ends at step S285, where record mod 314 records the solution found in step S280. The solution is recorded as a list of information (solution information) that includes the new scheduled runtime. In some embodiments, solution information may also include, but is not limited to: (i) the name of the batch job; (ii) the time the ABEND occurred; (iii) the type of ABEND or the ABEND code; (iv) the limiting resource; (v) the cause of the ABEND; and/or (vi) a set of less optimal available runtimes. Solution information may be included in resource usage data, collected in step S270, above, for analysis of future ABENDs. In this example, a database is constructed, for long-term storage of all solutions under the present invention, into which solution information is recorded. For the presented example, the solution information includes: the name of the backup batch job; the ABEND code; and the new scheduled runtime.

For at least some environmental ABENDs, execution of this process frees a user from the time and resource expense necessary for analysis and resolution of the environmental ABEND.

III. Further Comments and/or Embodiments

Some embodiments of the present invention recognize the following facts, potential problems, and/or potential areas for improvement with respect to the current state of the art: (i) inherent differences exist between environmental ABENDs and non-environmental ABENDs; (ii) in addition to addressing continuity of performance, there is a need to solve the underlying issues causing environmental ABENDs; and (iii) there is a need to confirm that predictive methods used to resolve ABENDs are accurate.

Some embodiments of the present invention may occur in multiple stages. The first stage is an information gathering stage, in which ABEND statistics are compiled for jobs that encountered ABENDs. ABEND statistics may include, but are not limited to: (i) the type of ABEND; (ii) the ABEND code, or other ABEND identifier; (iii) the reason for encountering that ABEND; (iv) the name of the job that encountered the ABEND; (v) the system running the job; (vi) the time the ABEND occurred; (vii) the frequency of the ABEND code; (viii) the frequency with which the job encounters ABENDs; (ix) other ABENDs occurring within a specified time prior to or after the occurrence of the ABEND; and/or (x) solutions to prior occurrences of the ABEND. The reason an ABEND occurred may be found by searching various locations within the computer, including, but not limited to: (i) a system and device error log; (ii) a message logger; (iii) a job activities log; and/or (iv) solution information. ABEND statistics may be sorted by ABEND code or other ABEND identifier.

The second stage identified the ABENDs related to environmental constraints. Messages are transmitted to the user regarding non-environmental ABEND types. The messages suggest methods of resolving or avoiding those ABENDs.

The third stage analyzes the ABEND. For environmental ABENDs, the computer produces certain error messages. Those messages are located in a system and device error log, a message logger, a job activities log, and/or solution information. For example, an out of space ABEND returns a message explaining the reason why additional space could not be allocated. For some environmental ABENDs the cause is transitory and can be avoided. For other environmental ABENDs the cause is permanent and avoidance is not a solution.

The fourth stage deals with proactive resolution of future ABENDs. Where the reason for the ABEND is permanent, a message is transmitted containing the relevant information and possible solutions that do not include avoidance. Where the reason for the ABEND is transitory, the schedule for the affected job is altered to avoid running the job at the time it encountered the ABEND. Some embodiments of the present invention automatically handle the schedule alteration. The schedule alteration process looks for ABENDs of the same type and, noting the times for each, schedules the job at a time during which the job is unlikely to incur a similar ABEND. Some embodiments of the present invention are directed to an iterative process that optimizes the computer on which the jobs run and optimizes the schedule alteration process by better determining times at which different jobs can run.

Some embodiments of the present invention are directed to a process including one, or more, of the following features, characteristics, and/or advantages: (i) determining whether an ABEND is caused by environmental factors; (ii) analyzing factors leading to environmental ABENDs; (iii) determining the ebbs and flows of transitory environmental factors causing ABENDs; (iv) modifying jobs that resulted in ABENDs to avoid known factors causing environmental ABENDs; (v) avoiding repeat environmental ABENDs; (vi) optimizing job timing based on known factors causing environmental ABENDs; (vii) using intelligent scheduling to optimize resource usage and avoid known factors causing environmental ABENDs; (viii) transmitting messages to a user notifying of implemented solutions to avoid environmental ABENDs; (ix) transmitting warning indicators to a user to notify of possible solutions to non-environmental ABENDs; (x) suggesting more optimal times to run jobs to avoid environmental ABENDs; and (xi) rescheduling jobs based on expected availability of resources to avoid environmental ABENDs.

Some embodiments of the present invention may include one, or more, of the following features, characteristics, and/or advantages: (i) differentiation between environmental ABENDs and non-environmental ABENDs; (ii) upon determination of the type of environmental ABEND, determination of more suitable times to run the job that abnormally terminated; (iii) rescheduling the job automatically and sending the user a message describing the implemented solution; and (iv) using actual data, instead of imprecise predictions, to determine ABEND solutions.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Environmental abnormal termination: an abnormal termination caused by factors within the operating environment, including those arising from a lack of resources; includes secondary abnormal terminations.

Non-environmental abnormal termination: an abnormal termination that is not an environmental termination.

Secondary abnormal termination: an abnormal termination directly resulting from a prior abnormal termination.

What is claimed is:

1. A method comprising:
   determining an abnormal termination of a job is an environmental type abnormal termination, wherein the environmental type abnormal termination is caused by a set of factors within an operating environment;
   collecting resource usage data related to the set of factors that caused the environmental type abnormal termination;
   analyzing resource availability, based at least in part on the resource usage data, to generate a resource availability analysis;
   determining the set of factors that caused the environmental type abnormal termination do not exist at an alternate runtime; and
   taking a rescheduling action, based at least in part on the resource availability analysis and determining the set of factors that caused the environmental type abnormal termination do not exist at the alternate runtime;
   wherein:
   at least the determining steps are performed by computer software running on computer hardware.

2. The method of claim 1, wherein the rescheduling action includes:
   scheduling the job for the alternate runtime.

3. The method of claim 2, wherein the alternate runtime is a best time based, at least in part, on the resource usage data and the resource availability analysis.

4. The method of claim 1, further comprising:
   transmitting a message to a user describing the rescheduling action.

5. The method of claim 1, wherein the resource usage data includes a set of prior rescheduling actions.

6. The method of claim 1, wherein the abnormal termination is a secondary abnormal termination.

7. The method of claim 1, wherein the set of factors within the operating environment include at least one factor selected from the group consisting of:
   a lack of memory resources;
   a lack of storage resources; and
   a lack of time to complete the job.

8. A computer program product comprising a computer readable storage medium having stored thereon:
   first program instructions programmed to determine an abnormal termination of a job is an environmental type abnormal termination, wherein the environmental type abnormal termination is caused by a set of factors within an operating environment;
   second program instructions programmed to collect resource usage data related to the set of factors that caused the environmental type abnormal termination;
   third program instructions programmed to analyze resource availability, based at least in part on the resource usage data, to generate a resource availability analysis;
   fourth program instructions programmed to determine the set of factors that caused the environmental type abnormal termination do not exist at an alternate runtime; and
   fifth program instructions programmed to take a rescheduling action, based at least in part on the resource availability analysis and determining the set of factors that caused the environmental type abnormal termination do not exist at the alternate runtime.

9. The computer program product of claim 8, wherein the rescheduling action includes:
   sixth program instructions programmed to schedule the job for the alternate runtime.

10. The computer program product of claim 9, wherein the alternate runtime is a best time based, at least in part, on the resource usage data and the resource availability analysis.

11. The computer program product of claim 8, further comprising:
   sixth program instructions programmed to transmit a message to a user describing the rescheduling action.

12. The computer program product of claim 8, wherein the resource usage data includes a set of prior rescheduling actions.

13. The computer program product of claim 8, wherein the set of factors within the operating environment include at least one factor selected from the group consisting of:
   a lack of memory resources;
   a lack of storage resources; and
   a lack of time to complete the job.

14. A computer system comprising:
   a processor set; and
   a computer readable storage medium;
   wherein:
      the processor set is structured, located, connected, and/or programmed to run program instructions stored on the computer readable storage medium; and
      the program instructions include:
         first program instructions programmed to determine an abnormal termination of a job is an environmental type abnormal termination, wherein the environmental type abnormal termination is caused by a set of factors within an operating environment;
         second program instructions programmed to collect resource usage data related to the set of factors that caused the environmental type abnormal termination;
         third program instructions programmed to analyze resource availability, based at least in part on the resource usage data, to generate a resource availability analysis;
         fourth program instructions programmed to determine the set of factors that caused the environmental type abnormal termination do not exist at an alternate runtime; and
         fifth program instructions programmed to take a rescheduling action, based at least in part on the resource availability analysis and determining the set of factors that caused the environmental type abnormal termination do not exist at the alternate runtime.

15. The computer system of claim 14, wherein the rescheduling action includes:
   sixth program instructions programmed to schedule the job for the alternate runtime.

16. The computer system of claim 15, wherein the alternate runtime is a best time based, at least in part, on the resource usage data and the resource availability analysis.

17. The computer system of claim 14, further comprising:
   sixth program instructions programmed to transmit a message to a user describing the rescheduling action.

18. The computer system of claim 14, wherein the resource usage data includes a set of prior rescheduling actions.

19. The computer system of claim 14, wherein the abnormal termination is a secondary abnormal termination.

20. The computer system of claim 14, wherein the set of factors within the operating environment include at least one factor selected from the group consisting of:
   a lack of memory resources;
   a lack of storage resources; and
   a lack of time to complete the job.

* * * * *